June 3, 1924.

K. STEWART 1,496,280

SELF LUBRICATING SPINDLE AND WHARVE FOR SPINNING SPINDLES

Filed Dec. 29, 1921

Inventor
K. Stewart
By Lawrence Langner
Attorney

Patented June 3, 1924.

1,496,280

UNITED STATES PATENT OFFICE.

KEITH STEWART, OF SHAMNAGGAR, BENGAL, BRITISH INDIA.

SELF-LUBRICATING SPINDLE AND WHARVE FOR SPINNING SPINDLES.

Application filed December 29, 1921. Serial No. 525,722.

*To all whom it may concern:*

Be it known that I, KEITH STEWART, manager Auckland Jute Mill, Shamnaggar, Bengal, British India, subject of His Majesty the King of England, residing at Auckland Jute Mill, Shamnaggar, have invented certain new and useful Improvements in Self-Lubricating Spindles and Wharves for Spinning Spindles, of which the following is a specification.

My invention relates to an improved construction of spindles of the type in use in spinning frames for jute, flax, cotton worsted and the like and has for its object to provide a spindle attached to ball bearings and having the bearings and the spindle within a constant bath of oil.

A further object of the invention is the construction of the wharve wherein the wharve is constructed with a cavity to act as an oil reservoir and the ball bearings are affixed to the centre thereof to prevent any transverse strain on the wharve or pulley.

The spindle passes through a stationary metal socket set within the neck rail, and said stationary socket is securely attached to the neck rail by means of a screw or the like. The stationary metal socket is continued beyond the neck rail with a reduced sectional area and acts as a brush for the spindle. Ports formed in this part allows of the lubrication of the spindle.

A ball bearing is attached to the lower extreme end of the stationary member and has its outer rotating surface attached to the wharve or pulley.

The wharve or pulley is made of two elements, the upper element which is first passed over the reduced and continued portion of the stationary member comprises a hollow ring to form a wharve or pulley having two annular flanges on its outer circumference to act as guides for the drive, and an annular inner flange to form the head of the oil reservoir, oil holes being formed in the annular inner flange to allow for lubrications. A lug may be formed in the inner periphery to act as a guide for the fixing of the ball bearings.

The lower end of the upper element is threaded to carry the cap or other element of the wharve or pulley.

The cap is firmly affixed on to the end of the spindle and has its outer circumference threaded so as to be firmly attached to the lower and inner circumference of the first element.

Figure 1:
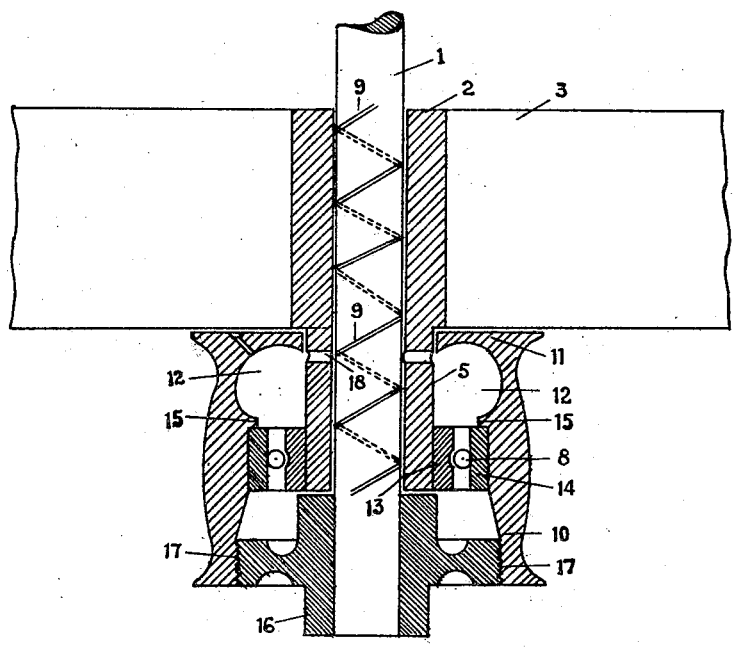
Figure 2:
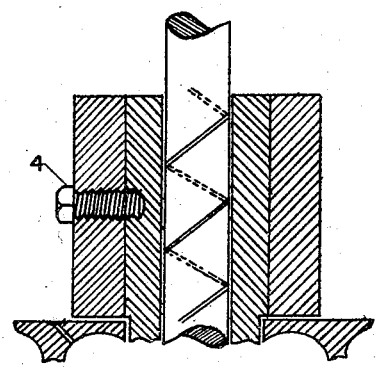

My invention is illustrated in the accompanying drawings in which Figure 1 shows a sectional elevation of my spindle and wharve, and Figure 2 a side elevation of the neck rail and attachment.

The stationary metal socket 2 passes through the neck rail 3 of a spinning machine and is further held firmly in position by means of a screw of the like, 4. The metal socket 2 is continued beyond the neck rail 3 with a reduced sectional area 5 forming a shoulder 6 right round the socket, the shoulder being flush with the lower surface 7 of the neck rail. The metal socket at 5 also acts as a bush for the spindle 1. At the lower and outer edge of the metal socket 2 is affixed the ball bearing 8 which makes for the smooth running of the device with a minimum of power.

The spindle 1 passes through the stationary metal socket 2 with a clearance of about $\frac{1}{32}''$. The spindle has a series of spiral grooves 9 cut on its outer periphery to allow for the constant lubrication of the spindle when same is being worked. The spiral grooves gradually shallow towards the upper end of the socket and by means of these grooves the spindle 1 working within the metal socket 2 is covered with a thin film of oil.

The wharve or pulley is made of two parts, the hollow casing 10 having an annular flange 11 on its upper and inner surface to form the cover of the oil reservoir. A hole (or slots) 12 are formed under the flange 11 to allow the lubrication of the device. The outer surface of the casing 10 has annular flanges on its extreme edges to act as guides for the driving means.

The wharve 10 is first passed over the end 5 of the stationary metal socket 2 and the ball bearings 8 are then inserted between the stationary metal socket and the casing. The inner surface 13 of the bearing being attached to the stationary socket 2 and the outer rotating surface 14 of the bearing fixed to the inner circumference of the casing 10. An annular shoulder 15 may be formed in the inner face of the casing 10 to act as a guide to position the bearing 8.

The bearing 8 being positioned at the centre of the wharve 10 the pull is directed on it and the spindle is thereby not subjected to any transverse strains.

The cap 16 of the wharve or pulley is rigidly attached to the end of the spindle 1 and is screwed into, or otherwise secured to the inner periphery of the lower end of the casing 10 as at 17.

The hollow outer casing 10 and the cap 16 thus form an oil reservoir in which the ball bearings work and ports are formed in the metal socket at 18 to allow of the access of oil to the spindle. Owing to the rotating motion of the wharve the oil under centrifugal action rises along the sides of the wharve and thus gains access to the spindle by means of the ports 18.

I claim:

1. A combined pulley and spindle, comprising a fixed socket, a spindle received by the socket and a pulley, fixed to the spindle and rotatably connected to the socket.

2. A device according to claim 1, the pulley being connected to the socket by a single ball bearing, located centrally of the ends of the pulley.

3. A device according to claim 1, the pulley forming a cup for receiving lubricant.

4. A device according to claim 1, the spindle having a spiral groove on the surface of the portion received by the socket, the socket being transversely perforated, intermediate its ends.

5. A device according to claim 1, the pulley forming a cup-like receptacle for receiving lubricant, and the spindle having a spiral groove on the surface of the portion received by the socket the socket having transverse perforations intermediate its ends, for communicating with the cup-like receptacle, and the spiral groove.

In testimony whereof I affix my signature.

KEITH STEWART.